United States Patent Office 3,444,122
Patented May 13, 1969

3,444,122
VINYL CHLORIDE POLYMER COMPOSITIONS CONTAINING A VINYL CHLORIDE, VINYL ACETATE, VINYL ALCOHOL TERPOLYMER AND AN EPOXY RESIN
George J. Antlfinger, Avon Lake, and Harold E. Von Kamp, Elyria, Ohio, assignors to The B. F. Goodrich Company, New York, N.Y., a corporation of New York
No Drawing. Filed Apr. 5, 1966, Ser. No. 540,195
Int. Cl. C08f 37/16, 45/72
U.S. Cl. 260—32.8                    8 Claims

ABSTRACT OF THE DISCLOSURE

Solvent resistant films of a vinyl chloride polymer are provided from mixtures of a copolymer containing a major proportion of vinyl chloride and lesser amounts of vinyl acetate and vinyl alcohol, an epoxy resin and a small amount of tris(dimethylaminomethyl)phenol.

---

This invention relates to solvent resistant vinyl chloride polymer compositions and relates more particularly to an improved coating composition and films of a hydroxyl-containing vinyl chloride polymer and an epoxy resin, and protective coatings thereof.

Copolymers containing a major proportion of vinyl chloride and lesser amounts of vinyl acetate and vinyl alcohol are valuable materials for use in forming coating compositions for wood, metal and glass. Such compositions, containing the copolymer and thermosetting resins, including the epoxy resins, have found utility in coating metal whereby strong flexible chemically resistant films are formed. While such compositions and the resulting films, usually applied in the form of lacquers or paints, have found wide acceptance, the solvent-resistance of such materials has not been completely satisfactory.

We have now found that a composition containing a copolymer of vinyl chloride, vinyl acetate and vinyl alcohol, an epoxy resin, and a small amount of tris(dimethylaminomethyl)phenol provides coatings with unexpected solvent resistance, superior to that of other known coatings made from such copolymers and epoxy resins.

The copolymers contain from about 88 to 93% vinyl chloride, about 2 to 5% vinyl acetate and about 5 to 7% vinyl alcohol. These copolymers are prepared, as is known by those skilled in the art, by copolymerizing from about 80 to about 95% vinyl chloride with about 20% vinyl acetate in suspension, emulsion or solution systems with a free-radical generating catalyst. The copolymers have an intrinsic viscosity of less than 0.5, preferably less than 0.3, measured in a 0.4% solution in nitrobenzene at 26.5° C. Thereafter the resulting copolymers are treated to hydrolysis conditions to partially hydrolyze the acetate portion of the copolymer. The hydrolysis is readily accomplished in solution or dispersion with alkali metal hydroxides, alkali metal alcoholates and the like, for example, with potassium hydroxide in methanol. Another method for providing such materials is described in U.S. Patent 2,852,499. Normally, greater than 60% and usually, about 70 to 90% of the acetate groups are hydrolyzed to hydroxyl groups. The copolymers preferably contain about 5 to 7% hydroxyl groups calculated as vinyl alcohol. Such copolymers preferably have an intrinsic viscosity in the range of about 0.2 to 0.3.

The copolymers may also contain less than 10% of the total of vinyl chloride and vinyl acetate of other polymerizable monoolefinically unsaturated vinylidene monomers containing the CH$_2$=C< grouping. Such materials include, for example, vinyl bromide; vinylidene chloride; isobutylene, ethylene; other vinyl esters such as vinyl butyrate; alkyl esters of acrylic and methacrylic acids as ethyl acrylate, butyl acrylate, octyl acrylate, methyl methacrylate, propyl methacrylate; vinyl aromatics including styrene, alpha-methyl styrene and vinyl toluene; vinyl ethers such as vinyl methylether and vinyl propyl ether; allyl esters and the like.

The epoxy resins useful in preparing the compositions of the invention are the polyepoxides having a plurality of

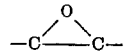

that is, vicinal epoxy, groups. They may be saturated or unsaturated, aliphatic, cycloaliphatic, aromatic or heterocyclic and may be substituted, if desired, with non-interfering substitutents, such as chlorine atoms, hydroxyl groups, ether radicals, and the like.

Particularly useful are the polymeric type of polyepoxides. For example, the polyepoxy polyhydroxy polyethers obtained by reacting, preferably in an alkaline or an acid medium, a polyhydric alcohol or a polyhydric phenol with a polyepoxide such as the reaction product of glycerol and bis(2,3-epoxy propyl) ether, the reaction product of sorbitol and bis(2,3-epoxy-2-methyl propyl) ether, the reaction product of pentaerythritol and 1,2-epoxy-4,5-epoxy-pentane, and the reaction product of bis-phenol and bis(2,3-epoxy-2-methyl propyl)ether, the reaction product of resorcinol and bis(2,3-epoxy propyl) ether, and the reaction product of catechol and bis(2,3-epoxy propyl)ether.

A further group of the polymeric polyepoxides comprises the hydroxy-substituted polyepoxy polyethers obtained by reacting, preferably in an alkaline medium a slight excess, e.g., 0.5 to 3 mol excess, of a halogen-containing epoxide as described above, with any of the aforedescribed polyhydric phenols, such as resorcinol, catechol, bis-phenol, bis(2,2'-dihydroxy-dinaphthyl)methane, and the like.

Also included within this group are the polyepoxy polyethers obtained by reacting, preferably in the presence of an acid-acting compound, such as hydrofluoric acid, one of the aforementioned halogen-containing epoxides with a polyhydric alcohol, such as glycerol, propylene glycol, ethylene glycol, trimethylene glycol, butylene glycol, and the like, and subsequently treating the resulting product with an alkaline component.

Other polymeric polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo additional polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and the like. Illustrative of these polymers are poly-(allyl 2,3-epoxypropyl ether), poly(2,3-epoxy propyl crotonate), allyl-2,3-epoxy propyl ether-styrene copolymer, poly (vinyl 2,3-epoxy propyl ether), allyl glycidyl ether vinyl acetate copolymer and poly(4-glycidyloxystyrene).

Particularly useful in the present invention are the low molecular weight, liquid glycidyl polyethers of dihydric phenols obtained by reacting epichlorohydrin with a dihydric phenol in an alkaline medium. The monomeric products of this type may be represented by the general formula

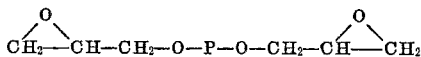

wherein P represents a divalent hydrocarbon radical of the dihydric phenol as

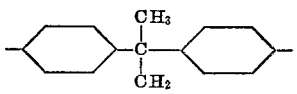

The polymeric products will generally not be a single simple molecule but will be a complex mixture of glycidyl polyethers of the general formula

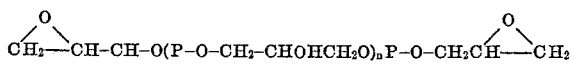

wherein P is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may, in some cases, contain a very small amount of material with one or both of the terminal glycidyl radicals in hydrated form.

A specific example of a liquid polyepoxide which is useful in the present invention is Epon 828, a pourable (160 poises at 25° C.), liquid epoxy resin having a melting point of 8–12° C. and an epoxide equivalency of 190 to 210 and is formed by reaction of 4,4'-dihydroxydiphenyl propane and epichlorohydrin in a molar ratio, respectively of about 1:2. Polyepoxides of a mixture of glycerol and epichlorohydrin are useful. Similar polyepoxides may also be used.

An essential constituent of the novel and improved compositions of this invention is a small amount of tris(dimethylaminomethyl)phenol. Use of this material is necessary for the obtainment of the desired solvent resistant compositions and its utility in providing the improved products of the invention was quite unexpected.

The amounts of reactants employed based on 100 weight parts of vinyl chloride copolymer, are from 5 to 100 parts of epoxy resin, preferably 10 to 40, and from 0.5 to 10, preferably 1 to 5 weight parts of tris(dimethylaminomethyl)phenol. The essential components are readily mixed together by conventional techniques, preferably in solvents therefor and after application are dried. Better results are obtained if the coatings are dried or heated at temperatures above 100° F., usually about 200° F. to 400° F. In the range of about 300–400° F. five to ten minutes being satisfactory.

Lacquers and paints of vinyl chloride copolymer-epoxy resin compositions are normally applied in the form of solutions or dispersions, as lacquers or paints which are readily prepared by methods known to those skilled in the art. Particularly useful solvents are the aliphatic ketones including methyl ethyl ketone, acetone, and the like, and which may also contain aromatic hydrocarbons such as toluenes, xylenes, and the like. The copolymer and epoxy resin are dissolved in the ketone solvent. Small amounts of vinyl chloride polymer plasticizers may be added, if desired, and pigments. Such pigments include alumina powder, titanium dioxide, zinc oxide, antimony oxide, chromic oxide, carbon black, red lead, white lead, iron oxide, heavy metal chromates, cadmium yellow and cadmium red, and the like. Other pigments, stabilizers, fillers, extenders and the like are added as needed or desired.

The following examples are illustrative of preparation of the novel compositions of the invention and demonstrate applications thereof.

Example I

A copolymer containing about 89% vinyl chloride, 6% vinyl alcohol and 5% vinyl acetate and having an intrinsic viscosity of 0.24 was dissolved in methyl ethyl ketone in an amount to provide a 25% solution of copolymer. Based on 100 parts of copolymer, varying amounts of Epon 828 were dissolved in separate portions of the copolymer solution. In the runs where tris(dimethylaminomethyl)phenol (DMP) is used 3 parts per 100 parts of copolymer are dissolved in the separate solutions. 0.006" films were cast on aluminum panels which were baked for 5 minutes at 300° F. The compositions were tested for resistance to methyl ethyl ketone by keeping the surface of the panel wetted with the solvent and rubbing vigorously with a saturated MEK pad for 30 seconds and repeating at minute intervals. The time necessary to break through the film to expose the metal was recorded and rated as follows:

| | | |
|---|---|---|
| Poor | 30 seconds | Resins without additives. |
| Fair | 1 min. 30 seconds | Resins with usual thermoset additives. |
| Good | 4 min. 30 seconds | Resins with additives claimed in this invention. |

The samples tested and amounts of reactants in parts per hundred of copolymer were:

| Samples | Epon 828 | DMP |
|---|---|---|
| 1 | 5 | 3 |
| 2 | 25 | 3 |
| 3 | 50 | 3 |
| 4 | 100 | 3 |
| 5 | | |
| 6 | 10 | |
| 7 | | 3 |
| 8 | 10 | 3 |

Samples 1, 2, 3, 4 and 8 all demonstrated good resistance to methyl ethyl ketone. Sample 5, the control, and 6 and 7 showed no resistance and were dissolved rapidly. Water and impact resistance for the films on the panels of Samples 1 through 4 and 8 were good. Sample 8 was repeated with the exception that the coating was air dried, not heated. Improved resistance to solvent was noted.

Example II

Another series of runs was made following the procedure of Example I with, in one case, the Epon 828 being substituted with Epon 812 which is a condensation product of epichlorohydrin and glycerin having an epoxide functionality of 2.2 and containing 10% chlorine. In a comparative example, triethylene tetramine was substituted for tris(dimethylaminomethyl)phenol.

| Run | Parts copolymer | Epon, parts | Dimethyl-amino phenol, parts | Triethylene tetramine, parts |
|---|---|---|---|---|
| 1 | 100 | 828–10 | 3 | |
| 2 | 100 | 828–15 | 3 | |
| 3 | 100 | 828–15 | 2 | |
| 4 | 100 | 828–15 | 1 | |
| 5 | 100 | 828–15 | | 3 |
| 6 | 100 | 812–15 | 3 | |

The solvent resistance of the products of Runs 1, 2, 3, 4 and 6 were very good. The product of Run 5 was very poor, demonstrating the criticality of dimethylaminophenol. Excellent products showing improved resistance to solvents are prepared as shown above from a copolymer of 91 vinyl chloride, 3 vinyl acetate and 6 vinyl alcohol.

Lacquers containing the composition of this invention are particularly useful in providing solvent resistant inner coatings in metal cans. Also, solvent resistant protective coatings, as in the form of paint compositions, for metal articles are readily provided through use of the novel compositions. For example, a formulation containing as parts by weight, 40 parts of isobutyl ketone; 40 parts of mixed xylenes; 20 parts of a copolymer of vinyl chloride, about 5 parts of vinyl acetate, 6 parts of vinyl alcohol; with 5 parts of Epon 828 and 0.6 part of tris(dimethylaminomethyl)phenol and about 20 parts of titanium dioxide may be used to coat metal articles, and when baked provide a resistant coating for many industrial applications which also is solvent resistant and which is not obtained with the normal hydroxyl containing vinyl chloride polymers and epoxy resins.

In essence, by means of the present invention, hydroxyl containing vinyl chloride polymers and epoxy resins which are soluble in organic solvents, after they are prepared in accordance with the invention and coated on the desired substrate and dried, preferably with the application of some heat, the resulting coatings are then resistant to the solvents in which the original vinyl chloride polymer and epoxy resin were soluble. Such compositions offer the trade useful, versatile and improved compositions for providing films which heretofore have not been available and for application formely closed to soluble hydroxyl containing vinyl chloride resins and the epoxies.

We claim:

1. A composition comprising polymeric constituents consisting essentially of a copolymer of about 88 to 93% vinyl chloride, about 2 to 5% vinyl acetate and about 5 to 7% vinyl alcohol and a liquid polyepoxide containing a plurality of vicinal epoxy groups, and tris(dimethylaminomethyl)phenol, in amounts based on 100 weight parts of copolymer of 5 to 40 parts of liquid polyepoxide and 0.5 to 10 parts of tris(dimethylaminomethyl)phenol.

2. The composition of claim 1 wherein the liquid polyepoxide containing a plurality of vicinal epoxy groups is the reaction product of 4,4'-dihydroxy-diphenyl propane or glycerol and epichlorohydrin and there is 10 to 40 parts of the liquid polyepoxide and 1 to 5 parts of tris(dimethylaminomethyl)phenol.

3. The composition of claim 2 wherein the copolymer contains about 89% vinyl chloride, about 5% vinyl acetate and about 6% vinyl alcohol.

4. The composition of claim 3 wherein the liquid polyepoxide is the reaction product of 4,4'-dihydroxy-diphenyl propane and epichlorohydrin and tris(dimethylaminomethyl(phenol is present in amounts of 2 to 4 parts.

5. A solvent resistant film of claim 1.

6. The composition of claim 1 coated on a metal substrate.

7. The method of providing a solvent resistant coating on a metal substrate which comprises depositing from solution on said metal a composition comprising polymeric constituents consisting essentially of a copolymer of about 88 to 93% vinyl chloride, about 2 to 5% vinyl acetate and about 5 to 7% vinyl alcohol, a liquid polyepoxide containing a plurality of vicinal epoxy groups, and tris(dimethylaminomethyl)phenol, in amounts based on 100 weight parts of copolymer and 5 to 100 parts of a liquid polyepoxide and 0.5 to 10 parts of tris(dimethylaminomethyl)phenol and drying the resulting coating.

8. The composition of claim 1 dissolved in an aliphatic ketone.

References Cited

UNITED STATES PATENTS

| | | | |
|---|---|---|---|
| 3,086,888 | 4/1963 | Stratton | 260—837 |
| 3,137,666 | 6/1964 | Lox | 260—837 |

SAMUEL H. BLECH, *Primary Examiner.*

U.S. Cl. X.R.

117—132, 161; 260—33.6, 37, 41, 836, 837